US010074209B2

(12) United States Patent
Fradet et al.

(10) Patent No.: US 10,074,209 B2
(45) Date of Patent: Sep. 11, 2018

(54) METHOD FOR PROCESSING A CURRENT IMAGE OF AN IMAGE SEQUENCE, AND CORRESPONDING COMPUTER PROGRAM AND PROCESSING DEVICE

(71) Applicant: THOMSON LICENSING, Issy de Moulineaux (FR)

(72) Inventors: Matthieu Fradet, Chanteloup (FR); Joan Llach Pinsach, Cesson Sevigne (FR); Philippe Robert, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 39 days.

(21) Appl. No.: 14/341,790

(22) Filed: Jul. 26, 2014

(65) Prior Publication Data

US 2015/0035828 A1 Feb. 5, 2015

(30) Foreign Application Priority Data

Jul. 31, 2013 (FR) ..................................... 13 57598

(51) Int. Cl.
*G06T 15/10* (2011.01)
*H04N 13/00* (2018.01)
*H04N 13/02* (2006.01)

(52) U.S. Cl.
CPC ......... *G06T 15/10* (2013.01); *H04N 13/0011* (2013.01); *H04N 13/026* (2013.01); *H04N 13/0264* (2013.01)

(58) Field of Classification Search
USPC ................................................. 345/421, 419
See application file for complete search history.

(56) References Cited

U.S. PATENT DOCUMENTS 7,813,528 B2 *  10/2010  Porikli ............... G06K 9/00771
                                                               348/155
7,974,456 B2 *   7/2011  Lee ...................... G06K 9/0014
                                                               382/133
(Continued)

FOREIGN PATENT DOCUMENTS

EP         1418766         5/2004
EP         2160037         3/2010
(Continued)

OTHER PUBLICATIONS

Vazquez et al., "Stereoscopic imaging filling disoccluded areas in depth image-based rendering", Proceedings of the SPIE—Three-Dimensional TV, Video and Display V, vol. 6392, 2006, pp. 1-12.
(Continued)

*Primary Examiner* — Kimbinh T Nguyen
(74) *Attorney, Agent, or Firm* — Tutunjian & Bitetto, P.C.

(57) ABSTRACT

A method for processing a current image of an image sequence is disclosed. According to the invention, the method includes:
identification of at least one region to be constructed associated with the current image, called unknown region,
selection of at least one construction technique for constructing said at least one unknown region,
association of at least one confidence indicator with said at least one unknown region, the confidence indicator being obtained by:
a first value representative of the use of temporal inpainting or inter-view inpainting inversely proportional to the temporal or inter-view distance,
a second value representative of the use of temporal inpainting or inter-view inpainting to construct said pixel, (Continued)

a third value representative of the minimum distance between said and a pixel of a known region,
a fourth value representative of the application of a color and/or luminance compensation.

22 Claims, 4 Drawing Sheets

(56) References Cited

U.S. PATENT DOCUMENTS

| | | | | |
|---|---|---|---|---|
| 8,184,880 | B2* | 5/2012 | Zhao | G06K 9/6211 345/419 |
| 8,526,716 | B2* | 9/2013 | Knee | H04N 13/0003 382/154 |
| 8,666,146 | B1* | 3/2014 | Smolic | G06T 3/0093 348/42 |
| 8,818,028 | B2* | 8/2014 | Nguyen | H04N 5/272 382/103 |
| 8,860,880 | B2* | 10/2014 | Knee | G06T 3/40 348/441 |
| 8,879,631 | B2* | 11/2014 | Shields | G06T 7/20 375/240.16 |
| 9,237,330 | B2* | 1/2016 | Wang | H04N 13/021 |
| 9,256,926 | B2* | 2/2016 | Berretty | G06T 5/005 |
| 2005/0104878 | A1* | 5/2005 | Kaye | G06T 5/005 345/419 |
| 2010/0014781 | A1* | 1/2010 | Liu | H04N 13/0022 382/285 |
| 2010/0164950 | A1* | 7/2010 | Zhao | G06T 7/0075 345/419 |
| 2011/0123113 | A1 | 5/2011 | Berretty et al. | |
| 2011/0123133 | A1* | 5/2011 | Mohanty | G06T 5/009 382/274 |
| 2012/0008672 | A1 | 1/2012 | Gaddy et al. | |
| 2012/0086775 | A1 | 4/2012 | Bae et al. | |
| 2012/0105435 | A1* | 5/2012 | Chen | G06T 15/205 345/419 |
| 2012/0120192 | A1* | 5/2012 | Alregib | G06T 5/00 348/43 |
| 2013/0208094 | A1* | 8/2013 | Tian | G06T 5/005 348/46 |
| 2014/0267243 | A1* | 9/2014 | Venkataraman | G06T 7/0065 345/419 |
| 2017/0094243 | A1* | 3/2017 | Venkataraman | H04N 13/0007 |

FOREIGN PATENT DOCUMENTS

| | | |
|---|---|---|
| EP | 2547113 | 1/2013 |
| KR | 2012026662 A | 3/2012 |
| WO | WO2012080961 | 6/2012 |

OTHER PUBLICATIONS

Cheng et al., "Spatio-temporally consistent novel view synthesis algorithm from video-plus-depth sequences for autostereoscopic displays", IEEE Transactions on Broadcasting, vol. 57, No. 2, Jun. 2011, pp. 523-532.
Ardis et al., "Inpainting quality assessment", Journal of Electronic Imaging, Jan.-Mar. 2010, vol. 19, No. 1, pp. 1-7.
Criminisi etal: "Region filling and object removal by exemplar-based image inpainting", IEEE Transactions on Image Processing, vol. 13, No. 9, Sep. 2004, pp. 1200-1212.
Ardis: Controlling and evaluating inpainting with Attentional Models; University of Rochester, Chapter 3, 2009, pp. 36-72.
Search Report dated Apr. 4, 2014.

* cited by examiner

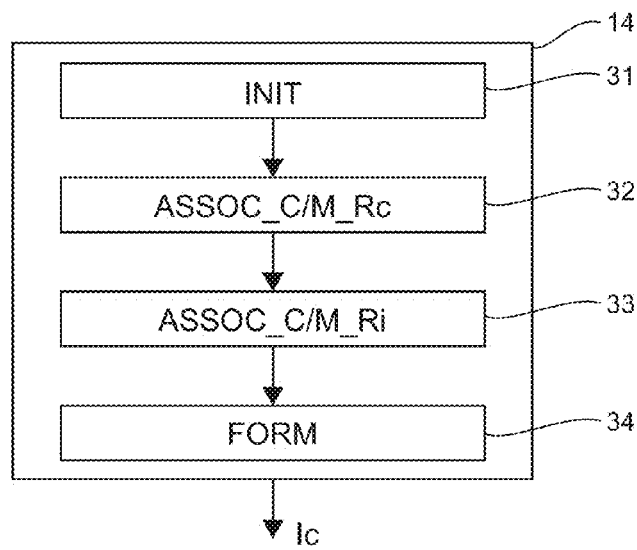
Fig. 3
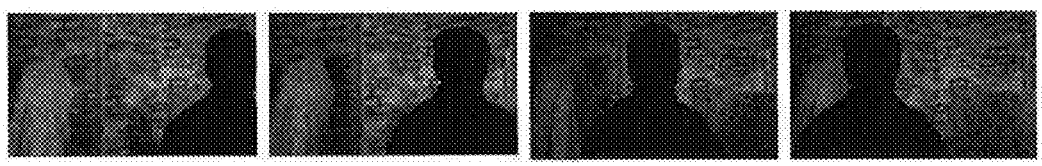
Fig. 4A   Fig. 4B   Fig. 4C   Fig. 4D
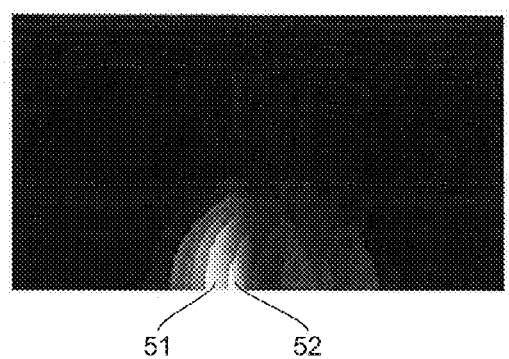 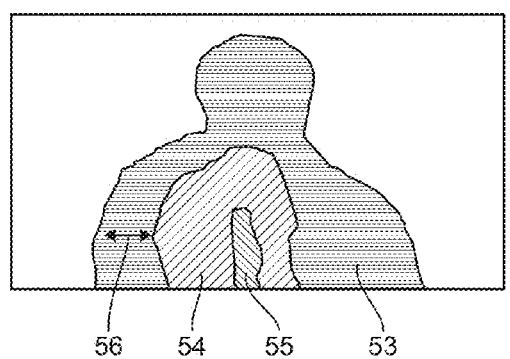
Fig. 5A   Fig. 5B

METHOD FOR PROCESSING A CURRENT IMAGE OF AN IMAGE SEQUENCE, AND CORRESPONDING COMPUTER PROGRAM AND PROCESSING DEVICE This application claims the benefit, under 35 U.S.C. § 119 of French Patent Application No. 1357598, filed Jul. 31, 2013.

1. FIELD OF THE INVENTION

The field of the invention is that of image processing, and notably processing of a video stream constituted of a series of successive images.

More specifically, the invention relates to the construction of a region of an image, when this region is for example hidden by an object/character in the image or when this region is revealed by use of a viewpoint different from the viewpoint having been used for capture.

The invention notably also finds applications in image processing systems offering object removal from an image of an image sequence and/or conversion of two-dimensional (2D) monocular image sequences to three-dimensional (3D) stereoscopic image sequences.

2. BACKGROUND OF THE INVENTION

Techniques for constructing image regions are already known. They generally implement
- temporal inpainting methods, that is to say with reference to one or more reference regions belonging to one or more images of the sequence different from the current image; and/or
- spatial inpainting methods, based on the neighbouring pixels of the current image.

The principle of temporal inpainting (also known as <<temporal filling>>) is to take advantage of the motion of a camera and/or the motion of different objects of the video sequence. This technique uses motion compensation.

Due to the motion, it is likely that a hidden region in a first image is visible in another (past or future) image of the video sequence. Motion estimation and image registration therefore make it possible to recover the missing information relating to the region hidden by an object/character at a time t of the image sequence.

However, it is also possible that, despite a motion in the image sequence, some regions are never visible or revealed due to the immobility of certain objects. In other words, for example, the combination of the absence of camera motion and the absence of motion of an object of the image has the result that the region hidden behind this object remains unknown during the entire sequence.

Such an unknown region may prove detrimental notably when seeking to carry out object removal processing on an image or view extrapolation processing, that is to say that when seeking to construct a new image from the current image with a viewpoint distinct from that used to capture the current image.

In order to overcome this disadvantage, it is possible to create manually from any patch the pixels associated with the unknown region or to determine them by spatial inpainting, using known pixels surrounding the region of unknown pixels as proposed by A. Criminisi et al. in the document "*Region filling and object removal by exemplar-based image inpainting*" (IEEE Transactions on Image Processing).

The automated use of temporal or spatial inpainting techniques delivers image sequences often marred by errors, while the semi-automatic or manual use of these techniques is costly in terms of time and also in terms of the money necessary to pay the person tasked with such manual or semi-automatic processing, called the image technician, for their hours of work.

In order to facilitate and reduce the work of the image technician, a method for evaluating the quality of an image comprising a reconstructed region has notably been proposed by P. Ardis in the document "*Controlling and Evaluating Inpainting with Attentional Models*" (chapter 3, University of Rochester 2009).

This technique is based on the calculation of salience maps using a visual attention model, and delivers a binary image classifier making it possible to establish if the quality of an image, as a whole, is "good" or "bad".

Thus, this technique only makes it possible to separate automatically the "good" images which are not to be reworked from the "bad" images requiring an additional manual correction. However, the fact remains that the image technician must identify the regions to be reworked within each image deemed bad by this method.

There therefore exists a need for a new image processing technique which is effective and simple to implement in order to reduce the time and money required for the manual processing of regions of the image whose automatic construction quality is bad.

3. SUMMARY OF THE INVENTION

The invention proposes a new solution which does not have all the disadvantages of the prior art, in the form of a method for processing a current image of an image sequence.

According to the invention, such a method comprises the following steps:
- identification of at least one region to be constructed associated with said current image, called unknown region, the size of said at least one unknown region being strictly less than the size of said current image,
- selection of at least one construction technique for constructing said at least one unknown region,
- association of at least one confidence indicator with said at least one unknown region, said confidence indicator being determined by taking into account said construction technique.

The invention thus proposes a new solution for processing an image of an image sequence when we wish notably to construct in an optimal way at least one region associated with an image. Such a region to be constructed is for example:
- hidden, due to it being located in the background, by an object and/or a character in the image, and/or
- revealed, due to it appearing during the extrapolation of a new image corresponding to a viewpoint different from the viewpoint used to capture the corresponding original image; in this case this revealed region corresponds, for example, to a band on the left of, on the right of, above or below the current image, but also to a region revealed due to it having appeared hidden by an object of the current image captured via the source viewpoint.

Such a hidden and/or revealed region is hereafter called "unknown region", "region to be constructed" or "extrapolated region".

According to the invention, it is possible to reconstruct a plurality of unknown regions, for example a region of the background hidden by a character and one or more external bands. It is therefore possible that the "sum" of the unknown regions to be constructed is greater in size than the size of the current image.

Thus, the technique proposed according to the invention is an image processing technique applicable to object removal and/or conversion of two-dimensional (2D) monocular image sequences to three-dimensional (3D) stereoscopic image sequences.

In fact, the technique of the invention proposes an aid to deciding on the quality of the automatic construction (and therefore whether or not it is able to be used) of such unknown regions, and if applicable to locating the parts of these unknown regions which require manual post-processing, and, to do this, is based on the association of a confidence indicator for example with any pixel or with a set of pixels of an unknown region according to at least one construction technique selected automatically to construct the unknown region automatically.

In other words, when a user wishes to access the pixels of an unknown region of the image to be processed, the method according to the invention implements an automatic construction of the unknown region to be constructed and simultaneously associates a confidence indicator, for example with any pixel, for the construction which would be obtained with said at least one automatically selected construction technique.

It should be noted that the technique according to the invention is new and inventive as it makes it possible to quantify the construction quality, for example of any pixel, of an unknown region constructed by automatic processing.

Thus, for each unknown region, an image technician tasked with manually post-processing the image in order to improve the restitution quality thereof with respect to the restitution which would be obtained by automatic construction obtains, for example in any pixel of this unknown region, a confidence indicator which enables him to adapt the manual processing to be performed notably according to the budget allocated to him to do so.

The steps of the method are therefore implemented automatically, that is to say successively without intervention of the user, and deliver, for example for each pixel of each unknown region a confidence indicator which makes it possible to establish whether the unknown region which would be constructed automatically, by means of the automatically selected construction technique, is feasible or not.

It should be noted that the technique according to the invention is distinguished from image coding techniques implementing a confidence index.

In fact, according to these coding techniques, no "unknown" region, corresponding to a region hidden by an object/a character in the image or revealed by a change in viewpoint, is identified. In fact, the coding technique aims to code the "known" image as a whole. In addition, for a coding technique, the confidence index makes it possible to optimise the coding of each pixel by choosing the prediction technique which offers the best compromise between reconstruction error at decoding and compression for example. Thus, in this case the confidence index is a criterion for selecting a technique for reconstruction, at decoding, making it possible to optimise coding/decoding.

By contrast, according to the present invention, no coding is implemented by the image processing method as such. However, an independent coding step might be implemented subsequently to code the images of the image sequence in the standard way. In addition, the technique for construction (and not for reconstruction at decoding) of an unknown region is automatically selected, and not by means of the confidence indicator delivered according to the automatic selection, which is only used as information to assist in manual post-construction.

Thus, according to the invention the confidence indicator is an item of information to assist in manual post-processing, while according to the coding techniques of the prior art a confidence index is a selection criterion.

According to a variant of the invention, the automatically selected construction technique is applied to inpaint the unknown region, and the confidence indicator is determined simultaneously at inpainting.

This variant is notably applied when a technique for construction by temporal inpainting or by inter-view inpainting is selected.

According to another variant, once the construction technique is selected, the confidence indicator is automatically determined without the region to be constructed being inpainted by the application of the selected construction technique.

This variant is notably applied when a technique for construction by spatial inpainting is for example selected.

The "confidence indicator-unknown region" association of the invention is for example delivered in the form of a data file, a look-up table comprising a column of coordinates of points/pixels of the unknown region and a column of confidence indicators associated with each point.

According to a particular aspect of the invention, the method further comprises a step of generation of an image to be processed, said image to be processed corresponding to the union of said current image and said at least one unknown region.

In other words, the method optionally implements the generation of an image to be processed whose size is the size of the image resulting from the union of the current image and said at least one region to be constructed, and whose values are either unknown for the pixels belonging to said at least one region to be constructed, or equal to those of the corresponding pixels of the current image for the other pixels.

Thus, when the intended application is limited to object removal the size of the image to be processed is equal to the current image; it is therefore not compulsory to carry out this step of generation of an image to be processed.

However, for an application for converting 2D monocular image sequences to 3D stereoscopic image sequences, generation of the image to be processed can help the user to view the overall number of pixels to be obtained by automatic construction or by manual construction.

However, the user can avoid this step and choose to implement a method processing the inpainting of each unknown region directly after their determination.

According to a particular embodiment of the invention, the method further comprises a step of construction and restitution of a confidence image representative of said at least one confidence indicator.

In other words, the confidence image is an image associated with the image to be processed, itself associated with the current image due to it resulting from the union of the current image and said at least one unknown region, wherein, for example, each pixel of an unknown region is identified and represented by a colour or colour hue, a pattern or a grey level corresponding to the value of confidence indicator which is associated therewith.

These steps of construction and restitution of the confidence image can be implemented automatically after the step of association according to the invention or on request of the image technician so as to defer the restitution.

The size of this confidence image is equal to the size of the image to be processed resulting from the union of the current image and the unknown region, and is therefore greater than or equal to the size of the current image.

In fact, in the case of 2D-3D conversion, we seek to extrapolate a new image which corresponds to a viewpoint different from the viewpoint corresponding to the source image. The regions hidden in the source viewpoint but visible via the new viewpoint must be constructed.

Moreover, it is possible that the new viewpoint is not clearly determined, that is to say that it falls to the image technician to adjust its position, and it is then preferable to perform the inpainting of the unknown regions not in the image captured by the new viewpoint which is not yet fixed, but instead in the current image captured by the source viewpoint by considering an image size enlarged with respect to the size of the source image, as though we were seeking to construct a panorama resulting from the union of the source image and the unknown image to be constructed obtained by changing viewpoint.

In fact, in this case changing viewpoint amounts to slightly displacing the image capture device to the left or to the right, which reveals a new vertical band to the left or the right of the image captured by the source viewpoint. This region corresponding to a (left or right) external band is therefore attached to the current image as an unknown region to be constructed, so that at this stage the image resulting from the union of the source image and the unknown region is wider than the current image. And the same applies for the confidence image which is restituted to the image technician who will adapt the post-processing of the image according to this aid for constructing unknown regions.

Thus, the confidence image corresponds to a confidence map or mask where only the unknown regions comprise patterns or colours or grey levels. The "known" regions, in other words the regions which are not to be constructed and whose reliability is assured, are transparent or represented by a default colour or pattern which will not be used for the unknown regions.

According to a particular aspect of the invention, the method further comprises a step of restitution of an image to be post-processed, said image to be post-processed being obtained by combining said image to be processed with said confidence image.

This image to be post-processed has the advantage of representing the reliability of parts of unknown regions which will not be concealed by an object or a character in the current image. Thus, the parts to be post-processed manually by the image technician are isolated and their automatic construction quality is directly restituted to the image technician.

These steps of construction and restitution of the image to be post-processed can be implemented automatically after the step of construction and restitution of the confidence image or on request of the image technician so as to defer the restitution of the image to be post-processed.

For example, when we wish to know the quality and process unknown zones due to a change in viewpoint to the left, the unknown regions to be processed correspond to a band to the left of the current image, and to a part of the background located on the perimeter of the object/character in the foreground.

According to a particular aspect of the invention, the step of identification of said at least one unknown region implements:

a step of separation of said current image into at least one foreground and one background, and/or a step of changing viewpoint of a device for capturing said current image.

Such post-processing operations make it possible to identify the unknown regions of the current image easily, these regions corresponding to regions in the current image or regions attached to the current image when these are not directly located by an item of identification information.

According to an aspect of the invention, the step of selection is performed from among construction techniques belonging to the group comprising:

construction by temporal inpainting, construction by spatial inpainting, construction by inter-view inpainting, when a device for capturing said current image is equipped with at least two distinct sensors.

Preferentially, the use of these techniques is prioritised in order to accelerate the selection of the construction technique to be used.

According to a particular variant of an embodiment of the invention, the step of association of at least one confidence indicator comprises the following steps, for a pixel to be constructed of said at least one unknown region:

determination of a first value $C1$ representative of the use of said technique for construction by temporal inpainting or said technique for construction by inter-view inpainting to construct said pixel and inversely proportional to the temporal and inter-view distance between said current image and a source image used for said temporal or said inter-view inpainting, determination of a second value $C2$ representative of the use of said technique for construction by temporal inpainting or said technique for construction by inter-view inpainting to construct said pixel, said second value $C2$ taking into account the mean square error associated with said technique for construction by temporal inpainting or said technique for construction by inter-view inpainting, determination of a third value $C3$ representative of the minimum distance between said pixel to be constructed of said unknown region and a pixel of the region distinct from said at least one unknown region of the image to be processed, called the known region of said image to be processed, determination of a fourth value $A$ representative of the application of a colour and/or luminance compensation, obtaining said confidence indicator by linearly combining said first, second, third and fourth values.

Thus, the confidence indicator takes into account the construction technique used, the square error associated therewith, the distance between a pixel to be constructed of the unknown region and a pixel of the known region of the image to be processed, and the application of a colour and/or luminance compensation. This indicator is therefore precise and complete in order to reliably assist the image technician.

Advantageously, said first, second, third and fourth values are weighted according to whether said pixel belongs to a region of interest and/or the salience of said pixel.

Thus, it is possible to weight the value of the confidence indicator for a pixel of an unknown region according to the relevance of this pixel in terms of region of interest or salience. For example, the closer a pixel of an unknown region to a salient region, the less confidence it is assigned.

According to a particular aspect of the invention, the step of construction of a confidence image comprises the following steps:

initialisation of said confidence image,
association of a constant colour and/or pattern with each pixel of said known region, delivering colour pixels associated with said known region,
for each pixel to be constructed of said at least one unknown region, called unknown pixel, association of a colour and/or pattern with the confidence indicator obtained for said unknown pixel, delivering a colour pixel associated with the unknown region, said colour being distinct from said constant colour,
formation of said confidence image comprising said colour pixels and/or patterns associated respectively with said known region and with said unknown region.

Thus, each confidence indicator value is represented by a colour within the confidence image; a colour code or pattern can therefore be used to identify the unknown regions whose automatic construction is reliable, average or poor and therefore to be post-processed manually as a priority.

As an example, a green colour or a green hue is associated with a high confidence indicator while a red colour or a red hue is associated with a low confidence indicator.

According to a first variant of this embodiment, two distinct confidence indicators are associated with two distinct colours or hues of colour.

This variant makes it possible to obtain at a pixel-wise resolution an accurate representation of the automatic construction reliability.

According to a second variant:
a first colour and/or pattern is associated with a confidence indicator less than a first predetermined threshold $\tau_1$,
a second colour and/or pattern is associated with a confidence indicator comprised between said first predetermined threshold $\tau_1$ and a second predetermined threshold $\tau_2$,
a third colour and/or pattern is associated with a confidence indicator greater than said second predetermined threshold $\tau_2$, Thus, only three colours will be used, for example, the red/orange/green triplet, or the black/grey/white triplet, in order to simplify the reading and analysis of the confidence image by the image technician who will be able to adjust the values of the thresholds $\tau_1$ and $\tau_2$ as he sees fit. Thus, the analysis time is reduced and savings are made.

For example, the image technician can adjust the thresholds $\tau_1$ and $\tau_2$ by means of a graphical interface comprising graphical cursors for incrementing/decrementing the values of the thresholds $\tau_1$ and $\tau_2$.

During this incrementation/decrementation, the image technician can according to this example view in real time the effect of the incrementation/decrementation of the values of the thresholds $\tau_1$ and $\tau_2$ on the restituted confidence image, and adjust these thresholds according to the compromise between automatic reconstruction reliability and manual work which he wishes to achieve.

Thus, the incrementation of the value of the threshold $\tau_2$, will reduce for example the range of the colour green representative of a "high" confidence index and therefore of a reliable automatic construction. Such an incrementation is required by the image technician when he wishes to increase the restitution quality after post-processing, which consequently requires an increase in manual post-processing.

By contrast, decrementing the value of threshold $\tau_2$, as with $\tau_1$, extends the "reliable" green zone and reduces the "to be processed by manual post-processing" red zone.

According to a particular aspect, the method further comprises a step of extraction of said unknown region or of a part of said unknown region.

For example, when two unknown regions are identified and when the confidence image informs the image technician that the automatic construction of one of two zones is reliable, it is possible, on request or automatically, to extract, from the image, only the zone to be manually post-processed, which makes it possible to assist the image technician and to accelerate his task.

In yet another embodiment, the invention relates to a computer program comprising instructions for the implementation of a method as described above, when this program is executed by a processor.

The method according to the invention can therefore be implemented in various ways, notably in wired form or in software form.

The invention also relates to a computer-readable storage medium comprising computer program instructions as mentioned above.

In another embodiment, the invention relates to a device for processing a current image of an image sequence. According to the invention, such a device comprises:
a module for identification of at least one region to be constructed associated with said current image, called unknown region, the size of said at least one unknown region being strictly less than the size of said current image,
a module for selection of at least one construction technique for constructing said at least one unknown region,
a module for association of at least one confidence indicator with said at least one unknown region, said confidence indicator being determined by taking into account said construction technique.

Such a device for processing a current image of an image sequence is notably adapted to implement the method for processing a current image of an image sequence previously described.

This device for processing a current image of an image sequence could of course comprise the different characteristics relating to the method for processing a current image of an image sequence previously described, which may be combined or taken separately. Thus, the characteristics and advantages of this device are the same as those of the method for processing a current image of an image sequence. Consequently, they are not detailed further.

Advantageously, such a device for processing a current image of an image sequence further comprises a module for construction and restitution of a confidence image representative of said at least one confidence indicator.

The different characteristics of the present invention can be implemented in the form of a system, devices, methods or computer-readable media. Consequently, the different characteristics of the present invention can take the form of an entirely hardware embodiment, entirely software embodiment or an embodiment combining software and hardware aspects.

Moreover, certain characteristics of the present invention can take the form of a computer-readable storage medium. Any combination of one or more computer-readable storage media can be used.

4. BRIEF DESCRIPTION OF THE DRAWINGS

Other characteristics and advantages of the invention will emerge more clearly upon reading the following description of a particular embodiment, provided as a simple non-restrictive example and referring to the annexed drawings, wherein:

FIG. 3 shows the steps implemented by the step of construction of a confidence image according to variant embodiments of the invention;

FIGS. 4A to 4D show different images of an image sequence,

FIGS. 5A to 5B show two examples of confidence images constructed according to the invention;

Figure 1:
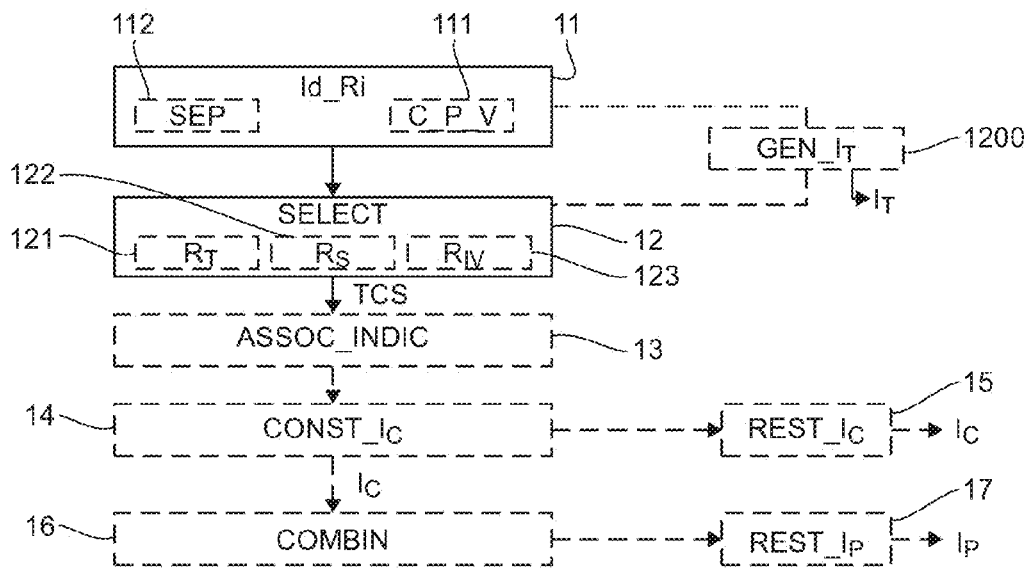
FIG. 1 shows the main steps implemented by a method for processing a current image of an image sequence according to an embodiment of the invention.

5. DETAILED DESCRIPTION OF PREFERRED EMBODIMENTS 5.1 General Principle

The general principle of the invention is based on the implementation of an association of a confidence indication with a region to be constructed, called unknown region, associated with a current image, the confidence indicator representing the reliability obtained by a construction technique selected and/or applied automatically according to selection and/or application criteria predetermined by default or by the user as described in more detail hereafter.

The reading of such a confidence indicator for an unknown region of the image makes it possible to optimise the subsequent manual processing which could be implemented by an image technician.

Thus, the present invention delivers feedback in order to assist the image technician in his efforts to improve the quality of the image sequence which he has to process.

Thus, the implementation of the invention automatically delivers an item of information to assist in processing the image. In fact, any region whose automatic construction is of poor quality is quickly and efficiently identified by the invention. Moreover, using the confidence indicator associated with, for example, each pixel of an unknown region, the image technician is able to accurately assess the quantity of manual work required to attain the desired level of construction quality for the unknown region of the image to be extrapolated from the current image.

Thus, according to the budget allocated for the processing of the image, the image technician is able to determine a compromise between budget and quality of the image.

The technique according to the invention can be applied to object removal from an image, notably when we seek to reprocess an image by removing an extra, a passer-by or a mark due an impurity present within the lens whether in the photographic field or the cinematographic field . . . .

The technique according to the invention can also be applied to the conversion of 2D monocular image sequences to 3D stereoscopic sequences.

More specifically, the construction of a (left-right) stereoscopic image sequence from an input monocular image sequence implements an extrapolation of the input monocular image sequence captured according to a first (for example left) viewpoint, by considering another (for example right) viewpoint or two neighbouring viewpoints of the viewpoint used for capturing the input sequence. This step of extrapolation takes into account the distance between the first (left) viewpoint and the other viewpoints, and the depth of each of the objects constituting the scene. A conversion of this type is called stereoscopic or stereo when it takes into account two distinct viewpoints for the restitution of the images making it possible to obtain a 3D effect.

In this case relating to the conversion of 2D monocular image sequences to 3D stereoscopic image sequences, the image technician is commonly call a stereographer.

The stereographer is regularly confronted with the problem concerning such an extrapolation. In fact, by changing viewpoint new regions appear within the extrapolated image with respect to the corresponding current image of the input sequence. These new regions are for example revealed because the change in viewpoint uncovers regions of the background in the extrapolated image, while these regions are hidden or concealed by an object in the foreground in the corresponding current image of the input sequence.

The thickness or width of these regions depends on the depth of the objects constituting the scene and the position between the two or more viewpoints used. In fact, the greater the distance between the cameras, the greater the size of the so-called unknown regions to be constructed.

According to this application for converting 2D monocular image sequences to 3D stereoscopic image sequences, the invention enables the stereographer who has little budget for manual processing of the 3D effect to develop a compromise between manual processing, 3D effect and restitution quality of the extrapolated image. In fact, according to the confidence indicator, the stereographer can decide to prioritise the quality to the detriment of the 3D effect, in other words to reduce the 3D effect by bringing the different viewpoints closer together, so as to reduce the size of the unknown regions and therefore maximise his chances of being able to use reliable automatic construction result in the majority of unknown regions, which makes it possible to limit the manual processing time and therefore the corresponding allocated budget.

In the field of 3D conversion, the method according to the invention can be applied to several types of conversions, namely:

"stereo-to-stereo" type when a change of place of restitution is desired, for example for moving from a restitution of a 3D film in a cinema to a restitution of a 3D DVD in a living room. The distance between the two viewpoints for a cinema 3D restitution and a living room 3D restitution being modified, the invention makes it possible to assist the stereographer to perform the conversion from images used for the cinema 3D restitution to images used for the living room 3D restitution;

"stereo-to-multiview" type when the stereographer must generate N image sequences corresponding to N different viewpoints (N being an integer greater than two) from a stereoscopic image sequence. This type of conversion requires a coherence of inpainting between the different viewpoints to be ensured, so that the confidence indicator delivered according to the invention is a very useful tool for validating or invalidating an automatic inpainting.

Moreover, the technique according to the invention can also be used to certify a posteriori the quality of an automatic or manual inpainting of an image to be certified whose regions which have been constructed are known. In this case, the method according to the invention is applied to the image to be certified.

When the application of the method according to the invention to the image to be certified (playing the role of current image) delivers a high confidence indicator for an unknown region, it is then verified that the values of the image to be certified in this unknown region are close to those provided by the automatic construction delivering a high confidence indicator.

In fact, as the confidence index is high for the automatic construction technique we ensure that the certified image has a region identical or almost identical to that obtained by the automatically selected construction technique.

By contrast, when the application of the method according to the invention to the image to be certified delivers a low confidence indicator for a region, it is then verified that the values of the image to be certified in this region are indeed different to those provided by the "bad" automatic construction delivering a low confidence indicator. In other words, it is checked that an alternative technique to that automatically selected has been used to construct the pixels associated with the low confidence indicator.

5.2 Description of a Particular Embodiment of the Method for Processing a Current Image of an Image Sequence According to the Invention We now show, in relation to FIG. 1, the main steps implemented by the method for processing a current image of an image sequence according to the invention.

Such a method for processing a current image of an image sequence comprises a step for identification Id_Ri (11) of at least one region to be constructed associated with the current image, called unknown region, said at least one unknown region being able to be identified within the current image or also being able to be attached to the current image such as a band of pixels identified by change in viewpoint, the size of the unknown region being strictly less than the size of the current image. In fact, this involves directly identifying the only zones of the image to be reworked and not binarily evaluating the construction quality of the image as a whole.

Figure 6A:
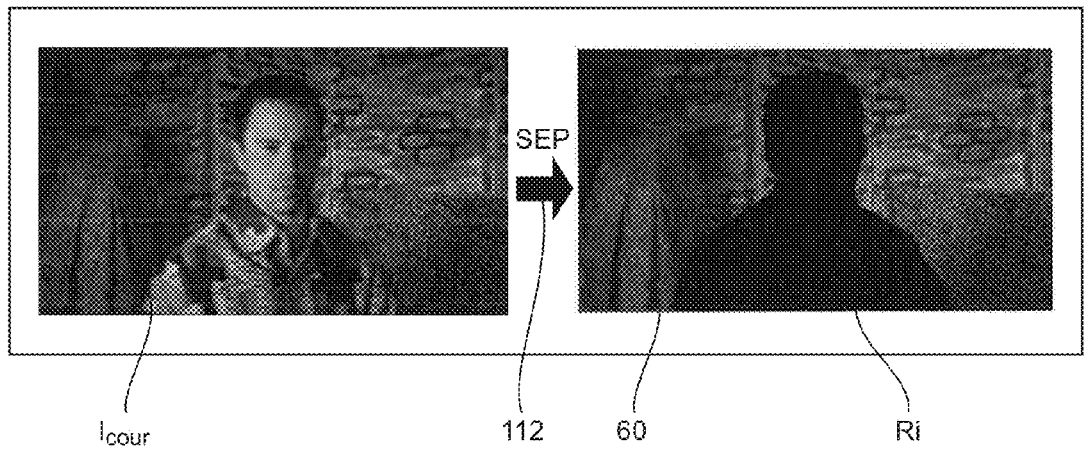
FIGS. 6A to 6B show two types of sub-steps which can be implemented by the step of identification according to variant embodiments of the invention.

Optionally, the step of identification Id_Ri (11) of the unknown region implements a step of separation SEP (112) of the current image into at least one foreground and one background. This separation processing implemented by the step of identification according to the invention is notably shown by FIG. 6A, according to which the separation (112) consists in isolating for example the background 60 of a current image $I_{cour}$. This step of separation is particularly implemented when an object/character removal is intended. FIG. 6A notably shows the removal of a character from the foreground. The region located under this character in the background corresponds to the unknown region Ri which we are seeking to construct to obtain an image associated with the current image without character.

The identification of an unknown region to be constructed can also implement as an alternative or in combination with the step of separation SEP (112) of the current image into at least one foreground and one background, a step of changing viewpoint C_P_V (111) of a device for capturing the current image $I_{cour}$.

Figure 6B:
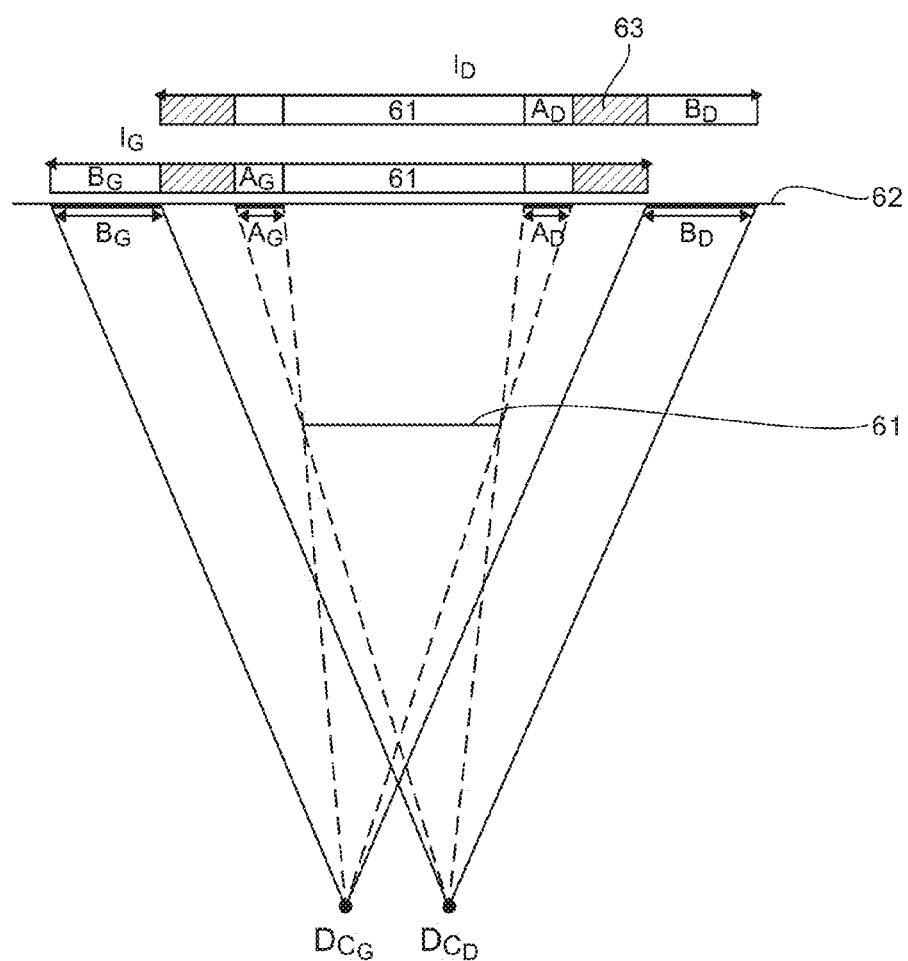

This step of changing viewpoint C_P_V (111) is notably shown by FIG. 6B. Thus, a stereo 3D effect is formed from two capture devices, one located on the left $D_{CG}$ and the other located on the right $D_{CD}$. As shown by FIG. 6B, the change in viewpoint between these two devices $D_{CG}$ and $D_{CD}$ delivers two images $I_G$ and $I_D$ which differ from one another by the restitution of regions $A_G$ and $A_D$ of the background (62) located behind a foreground object (61) but also by external bands $B_G$ and $B_D$ corresponding to the visual fields of each capture device $D_{CG}$ and $D_{CD}$.

Regions $A_G$ and $B_G$ are only visible by the capture device located on the left $D_{CG}$, while regions $A_D$ and $B_D$ are only visible by the capture device located on the right $D_{CD}$.

In other words, images $I_G$ and $I_D$ will have the foreground object (61) and the zones of the background shown as hatched (63) in common.

Then, the method according to the invention optionally implements, after the first identification step Id_Ri (11), a step of generation GEN_$I_T$(1200) of an image to be processed $I_T$ whose size is defined so that it contains the union of the current image and said at least one unknown region, and whose values are either unknown for the pixels belonging to said at least one unknown region or equal to those of the corresponding pixels of the current image for the other pixels.

Then, the method according to the invention implements a step of selection SELECT (12) of a construction technique $T_{CS}$ for constructing the unknown region Ri.

In particular, the step of selection SELECT (12) is performed from among construction techniques belonging to the group comprising:
construction by temporal inpainting $R_T$,
construction by spatial inpainting $R_T$,
construction by inter-view inpainting $R_{IV}$, when a device for capturing the current image $I_{cour}$ is equipped with at least two distinct sensors.

The temporal inpainting technique $R_T$ takes advantage of the motion of a camera and/or the motion of different objects of the video sequence as shown by FIGS. 4A to 4D showing different images of an image sequence.

This selection is automatic and aims to select the best inpainting technique. To do this, a degree of priority is for example used in order to prioritise the construction techniques which make it possible to obtain the best automatic construction quality. This degree of priority is assigned by default according to a first example, or fixed by the user according to another example.

Thus, the temporal inpainting technique is used preferentially with respect to the spatial inpainting technique which is itself used last when an inter-view inpainting technique is available.

The priority between the temporal inpainting technique and the inter-view inpainting technique is fixed by default according to a first example, or fixed by the user according to another example according to the knowledge of the user of the image sequence and of the multi-view equipment used. Thus, according to the application sought, inter-view inpainting has priority over temporal inpainting or vice versa.

It should be noted that several inpainting techniques can be used to construct an unknown region. In fact, chronologically, once the region is determined, a first construction technique is selected because it has the highest degree of priority.

If this first technique does not succeed in inpainting the entire region, a second technique is selected in order to continue inpainting what has not yet been. Ultimately, spatial inpainting makes it possible to inpaint the parts of the unknown region not inpainted by the two preceding techniques.

According to another example embodiment, the assignation of this degree of priority takes into account the morphology of the unknown region. The morphology of an unknown region is for example detected by means of the number of pixels which constitutes it. An unknown region corresponding to a very fine hole is for example ideal for spatial inpainting. Thus, according to this example spatial filling will have a greater degree of priority with respect to the other inpainting techniques, which are less suitable for inpainting an unknown region corresponding to a very fine hole.

Once the construction technique is automatically selected $T_{CS}$, the method according to the invention implements a step of association ASSOC_INDIC (13) of at least one confidence indicator INDIC with unknown region Ri, the confidence indicator INDIC being determined by taking into account the previously selected construction technique $T_{CS}$. Such an association is performed pixel by pixel for the unknown region Ri, or for a group of pixels of the unknown region Ri, or for the unknown regions Ri as a whole.

Figure 2:
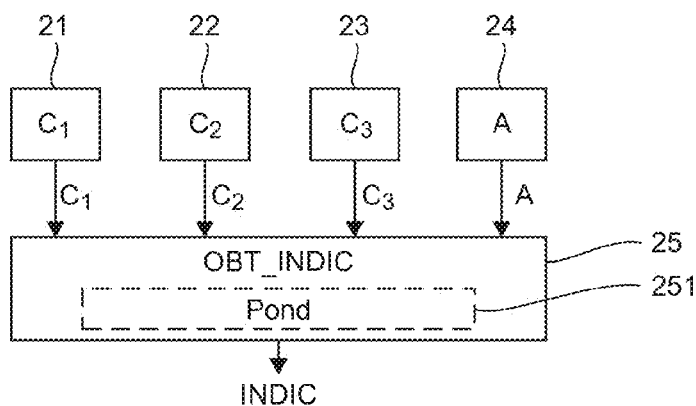
FIG. 2 shows the steps implemented by the step of association of at least one confidence indicator according to variant embodiments of the invention.

As shown in FIG. 2, the step of association ASSOC_INDIC (13) of at least one confidence indicator INDIC with unknown region Ri implements the following sub-steps:
- determination 21 of a first value C1 representative of the use of the technique for construction by temporal inpainting or the technique for construction by inter-view inpainting to construct the pixel and inversely proportional to the temporal and inter-view distance between the current image $I_{cour}$ and a source image used for the temporal or inter-view inpainting, this source image belonging for example to the image sequence as shown by FIGS. 4A to 4D,
- determination 22 of a second value C2 representative of the use of the technique for construction by temporal inpainting or the technique for construction by inter-view inpainting to construct the pixel, the second value C2 taking into account the mean square error associated with the technique for construction by temporal or inter-view inpainting,
- determination 23 of a third value C3 representative of the minimum distance between the pixel to be constructed of the unknown region and a pixel of the region distinct from said at least one unknown region of the current image, called the known region of the current image,
- determination 24 of a fourth value A representative of the application of a colour and/or luminance compensation (e.g. using Poisson blending) on the constructed pixel to compensate the possible colour and/or luminance changes appearing either between the different images of the sequence in case temporal inpainting is used to construct the pixel or between the different views in case inter-view inpainting is used to construct the pixel,
- obtaining OBT_INDIC 25 the confidence indicator INDIC by linearly combining first, second, third and fourth values.

Optionally, the first (C1), second (C2), third (C3) and fourth (A) values are weighted (251) according to whether the pixel considered belongs to a region of interest and/or the salience of this pixel.

More specifically, C1 is for example obtained according to the following equation for a pixel p of the image to be processed of temporal index t and viewpoint index v:

$$C1(p, t, v) \approx \begin{cases} \frac{1}{\Delta} & \text{if a temporal or inter-view inpainting technique is used} \\ 0 & \text{if a spatial inpainting technique is used} \end{cases}$$

where A is the product of the temporal distance and the inter-view distance between the current image and the image used for temporal or inter-view inpainting, called the "source" image of temporal index s and viewpoint index w, that is to say $\Delta=(|t-s|+1)\cdot(|v-w|+1)$.

C2 is for example obtained according to the following equation for a pixel p of the current image of temporal index t and viewpoint index v:

$$C2(p, t, v) \approx \begin{cases} \frac{1}{1+e(t, s, v, w)} & \text{if a temporal or inter-view inpainting technique is used} \\ 0 & \text{if a spatial inpainting technique is used} \end{cases}$$

where s is the temporal index and w is the viewpoint index of the "source" image, e(t,s,v,w) is the mean square error of the realignment of the source image indexed s,w with respect to the image to be processed of index t,v such that:

$$e(t, s, v, w) = \frac{\sum_{p \in \Omega} \|I_{t,v}(p) - W_{s,t,w,v}(p)\|^2}{|\Omega|}$$

where $I_{t,v}$ is the image resulting from the union of the current image and the unknown region, called the image to be processed, $W_{s,t,w,v}$ is the image obtained by realignment of the source image of indices s,w with respect to the resultant image $I_{t,v}$, $\Omega$ is the intersection of the known region $R_c$ of the resultant image $I_{t,v}$ and the known region of image $W_{s,t,w,v}$, and |.| is the cardinal function which associates with a given region its size in pixels.

C3 is for example obtained according to the following equation for a pixel p:

$$C3(p) \approx \frac{1}{d}$$

where d is the Euclidean distance between the pixel inpainted by the selected construction technique $T_{CS}$, and the closest pixel of the known region $R_c$ of the current image.

The fourth value A is a strictly positive value if a colour and/or or luminance compensation is applied. If no colour and/or luminance compensation is incorporated, the value of constant A is zero.

The step of obtaining OBT_INDIC 25 the confidence indicator INDIC implements for example the following equation for a pixel p:
INDIC(p)=α C1(p)+β2(p)+γC3(p)+A, α,β,γ being factors corresponding to positive weighting constants (251) which make it possible to adjust the influence of each of the 4 values in the confidence indicator.

Moreover, the value of the confidence indicator for a pixel can undergo an additional weighting (not shown) according to the relevance of this pixel in terms of salience. As a precaution, for example, the closer a pixel of an unknown region is to a salient region, the less confidence is assigned to it.

Then, once the confidence indicator INDIC is automatically associated with an unknown region Ri, for example the region located in the background under a character and/or the external band $B_G$ as shown by FIG. 6B, the method according to the invention optionally and preferentially implements a step of construction CONST_$I_C$ (14) and restitution REST_$I_C$ (15) of a confidence image $I_C$ representative of the confidence indicator INDIC.

As shown in FIG. 3, the step of construction CONST_$I_C$ (14) implements the following sub-steps:
- initialisation INIT (31) of the confidence image $I_C$,
- association ASSOC_C/M_Rc (32) of a constant colour and/or pattern with each pixel of the known region, delivering colour pixels associated with the known region,
- for each pixel to be constructed of the unknown region, called unknown pixel, association ASSOC_C/M_Ri (33) of a colour and/or pattern with the confidence indicator obtained for the unknown pixel, delivering a colour pixel associated with the unknown region, the colour being distinct from the constant colour,
- formation FORM of the confidence image $I_C$ comprising the colour pixels and/or patterns associated respectively with the known region and with the unknown region.

The step of initialisation INIT (31) of the confidence image $I_C$ makes it possible to render the confidence image Ic "blank". Thus, according to an example embodiment, the confidence image is transparent. The size of this confidence image $I_C$ is equal to the size of the image to be processed, itself of size greater than or equal to the size of the current image. In fact, it equals the size of the current image to which the unknown regions obtained for example by changing viewpoint are added.

Two examples of confidence images are for example shown by FIGS. 5A and 5B.

In FIG. 5A, two distinct confidence indicators (in other words two distinct confidence indicator values) are associated with two distinct colours or hues of colour, corresponding here to grey levels. The rule for assigning colours aims here to assign the darkest, in other words blackest, colour when the confidence index INDIC is maximal.

In particular, in FIG. 5A "slices" 51 and 52 are shown and correspond to two distinct values of Δ the temporal distance between two images of the image sequence used for temporal inpainting.

According to another example shown by FIG. 5B, confidence image $I_C$ is obtained so that:
- a first colour and/or pattern (55) is associated with a confidence indicator less than a first predetermined threshold $\tau_1$,
- a second colour and/or pattern (54) is associated with a confidence indicator comprised between the first predetermined threshold $\tau_1$ and a second predetermined threshold $\tau_2$,
- a third colour and/or pattern (53) is associated with a confidence indicator greater than the second predetermined threshold $\tau_2$.

Thus, with respect to FIG. 5B, the part of the unknown region Ri corresponding to the third colour 53 is a zone where the confidence indicator is high which reflects reliability of the automatic construction. The arrow 56 represents the width of this part corresponding to the third colour 53, this width being able to be extracted from the confidence image in order to correlate it for example with the distance between two capture devices of a stereoscopic system delivering a 3D effect.

In other words, it is possible for a minimum required confidence value to calculate the maximum distance for which all the pixels constructed in the unknown region and located at a horizontal distance less than or equal to said maximum distance to the right (respectively to the left) of a known pixel have a confidence indicator whose value is greater than or equal to the minimum required confidence value. The image technician can use this maximum distance to optimise the quality/3D effect compromise.

Conversely, it is possible to calculate the minimum confidence value from among the confidence values for the pixels constructed in the unknown region and located at a horizontal distance less than or equal to a given distance to the right (respectively to the left) of a known pixel.

Moreover, the part of the unknown region Ri corresponding to the second colour 54 is a zone where the confidence indicator is medium which reflects decreased reliability of the automatic construction with respect to the part concealed by the third colour.

The manual processing of the part of the unknown region Ri corresponding to the second colour can therefore be debatable for the image technician.

In fact, if the image technician has a significant budget and time, the manual processing of this part will make it possible to improve the image quality.

By contrast, if the image technician has a small budget allocated for manual construction and/or limited time to carry it out, then he may decide to keep the automatic construction result.

Finally, the part of the unknown region Ri corresponding to the first colour 55 is a zone where the confidence indicator is particularly low which reflects a lack of performance of the automatic construction. Viewing this first colour encourages the image technician to implement a manual construction of this zone in order to avoid the introduction of very disruptive artefacts during restitution.

In view of this feedback, the image technician, when it is a matter of applying the technique according to the invention to the conversion of 2D monocular image sequences to 3D stereoscopic image sequences, can also decide to modify the distance between the image capture viewpoints in order to adjust the size of the unknown regions actually visible in the extrapolated image, and as a result adapt the time and money required for any manual work.

According to an aspect not shown, it is possible to extract for each part of the unknown region Ri having a distinct colour, the number of pixels which compose it in order to perform independently a statistical processing operation aiming to extract the number of pixels, the maximum value and the minimum value of the confidence indicator for each part, or an item of statistical information indicating a percentage of reliable pixels, a percentage of pixels requiring a manual construction or a percentage of pixels to be discussed according to the financial and time resources of the image technician.

Such a statistical processing operation can be further applied to the image sequence as a whole, due to the presence of a known region common to all images of the image sequence.

It is also possible to implement automatically a step of extraction of the unknown region or a part of the unknown region, notably that whose confidence indicator is less than a first predetermined threshold $\tau_1$, in order that the image technician directly has the location of the region to be post-processed by manual construction.

Then, once the step of construction CONST_$I_C$(14) and restitution REST_$I_C$ (15) is implemented, the method according to the invention optionally and preferentially implements a step of restitution REST_$I_P$ (17) of an image to be post-processed $I_P$, the image to be post-processed $I_P$ being obtained by combination COMBIN of the image to be processed $I_T$ and the confidence image Ic.

More specifically, these steps are for example implemented for a conversion of 2D monocular image sequences to 3D stereoscopic image sequences. In fact, as shown by FIGS. 7A to 7D, using a current image $I_{cour}$ shown by FIG. 7A and obtained by a capture device located on the right $D_{CD}$ as shown by FIG. 6B, we seek to extrapolate the image, shown by FIG. 7B, which would be obtained by a capture device located on the left $D_{CG}$.

Figure 7A:
FIGS. 7A to 7E show the images resulting from the various steps of the invention, the image to be processed according to the invention being shown by FIG. 7D.
Figure 7B:
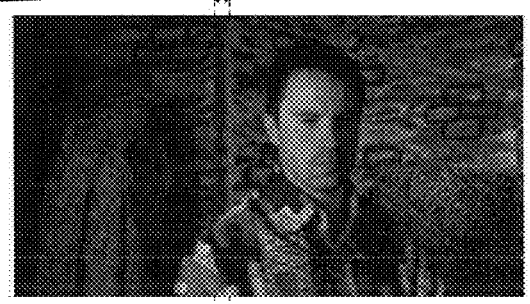

Image 7B therefore corresponds to the image which we seek to obtain from the image of FIG. 7A in order to avoid the use of the capture device located on the left $D_{CG}$.

The change in viewpoint between the two capture devices $D_{CG}$ and $D_{CD}$ has the result of a modification (according to the distance between the two capture devices 70) in the position of the objects/characters in the extrapolated image with respect to the current image $I_{cour}$.

Figure 7C:
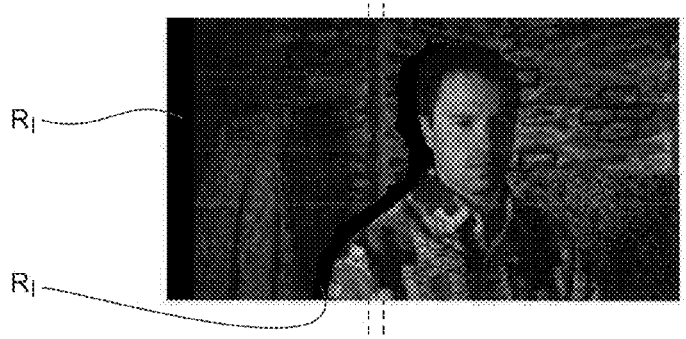

FIG. 7C shows the image projected on the left as shown (image $I_G$) in FIG. 6B, thus this project image comprises unknown regions Ri corresponding to zones $A_G$ and $B_G$ of FIG. 6B when the object in the foreground is a physical person.

Image 7B corresponding to the image obtained by the capture device located on the left $D_{CG}$ and image 7C are therefore aligned and offset with respect to the current image by the distance 70 between the two capture devices $D_{CG}$ and $D_{CD}$.

Figure 7D:

FIG. 7D shows the image to be processed $I_T$ wherein the occulted regions in the current image are unknown and shown in black. This figure therefore shows the identification Id_Ri (11) of the unknown region Ri of the image to be processed $I_T$ implemented by a step of changing viewpoint of a device for capturing the current image $I_{cour}$, the unknown region Ri being constructed by inpainting.

As may be noted, the image to be processed $I_T$ is, according to the example of FIG. 7D, of greater size than the current image, due to it resulting from the union of the current image $I_{cour}$ and two unknown regions Ri. Region Ri located on the left of the current image is of greater size than that shown by FIG. 7C obtained by changing viewpoint according to a first distance 70 between the capture devices $D_{CG}$ and $D_{CD}$. In fact, this region Ri located on the left of the current image takes into account a plurality of distances between the two capture devices $D_{CG}$ and $D_{CD}$ in order to adapt the manual processing compromise to be made according to this distance. In other words, region Ri of FIG. 7D has been deliberately identified as excessively wide so that this entire region is constructed and is assigned confidence values. The image technician can then adjust to his liking the distance 70 between the two capture devices $D_{CG}$ and $D_{CD}$ without having to re-initiate the construction of the unknown regions.

In fact, the more the distance between the two capture devices $D_{CG}$ and $D_{CD}$ increases, the more the size of the region to be reconstructed increases but conversely the greater the 3D effect.

According to another example, not shown, it can be considered that the image to be processed $I_T$ comprises for example an unknown region hidden behind an object of the current image and four unknown regions corresponding to bands located on the left of, on the right of, above and below the image in order to take into account different changes in viewpoint, in other words different capture device positions.

Then, the steps of selection SELECT (12), association ASSOC_INDIC (13), construction CONST_IC (14) of the confidence image $I_C$, and restitution REST_$I_C$(15) of this confidence image $I_C$ are automatically implemented according to the method of the invention.

Figure 7E:
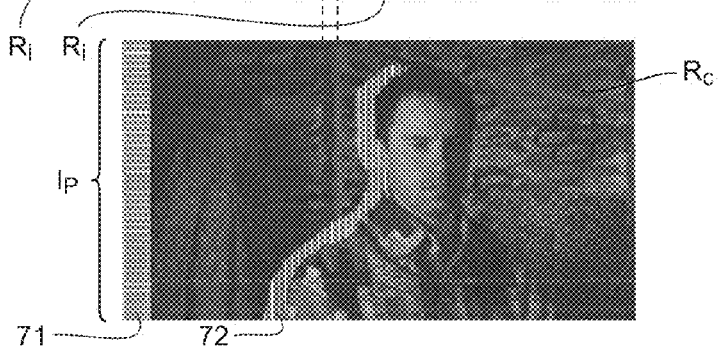

The confidence image $I_C$, whose examples have been previously described and shown by FIGS. 5A and 5B, is then combined (16) with the image to be processed $I_T$ after construction of the unknown regions to form the image to be post-processed $I_P$ shown by FIG. 7E, when the image technician has selected the first distance 70 between the two capture devices $D_{CG}$ and $D_{CD}$. This figure therefore presents to the image technician the regions, called known regions Rc, of the current image which are common to the extrapolated image and which as a result are not to be constructed, and the unknown regions Ri (71) and (72) obtained by changing viewpoint, reconstructed by an automatic inpainting method and on which has been superimposed a colour corresponding to the confidence indicator INDIC which is associated therewith. Thus, external band $B_G$ (71) is according to the example of FIG. 7E represented by a pattern of horizontal hatches reflecting a "medium" confidence indicator, as the automatic construction of this region implements spatial inpainting in an external band of the image, this external band being considered less vital for the restitution of a central zone of the image.

The unknown region (72) located on the left perimeter of the character is according to the example of FIG. 7E represented by a pattern of vertical hatches reflecting a "good" confidence indicator, as the automatic construction of this region implements temporal inpainting in a "border" part of the unknown region located in the background behind the character, this border part being by definition not far from the known regions of the image.

In view of the image to be post-processed $I_P$ shown by FIG. 7E, the image technician is therefore able to make a decision with respect to the manual post-processing to be applied or not in order to obtain a good quality of extrapolated image.

For example, as a result of the confidence indicator for the unknown region located at the perimeter of the character 72 being good, the image technician will choose to validate the automatic construction of this region and conversely will choose to concentrate on the left external band (71) when his budget allows him.

Figure 8:
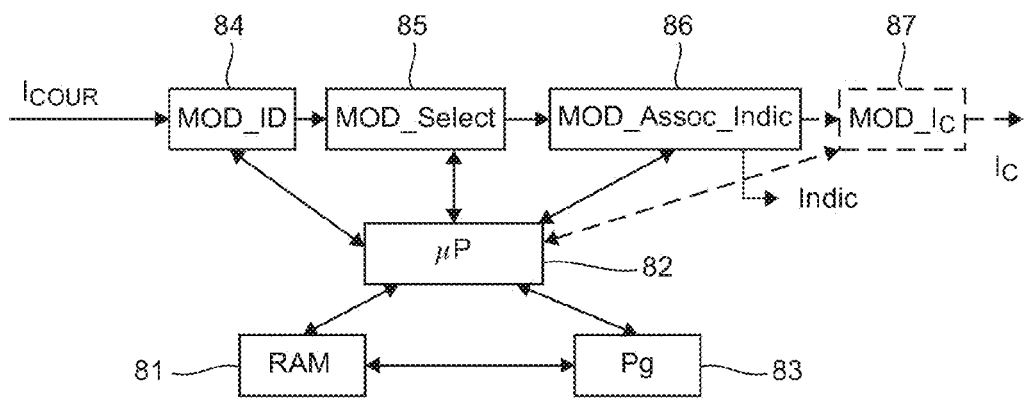
FIG. 8 shows respectively the simplified structure of a device for processing a current image of an image sequence according to a particular embodiment of the invention.

5.3 Description of the Device for Processing a Current Image of an Image Sequence According to the Invention As shown in FIG. 8, such a device for processing a current image of an image sequence comprises a memory 81 comprising a buffer memory, a processing unit 82, equipped for example with a microprocessor µP and controlled by computer program 83, implementing the method for processing a current image of an image sequence according to the invention.

At initialisation, the code instructions of the computer program 83 are for example loaded into a RAM memory before being executed by the processor of the processing unit 82. The processing unit 82 receives at input a current image of an image sequence $I_{cour}$. The microprocessor of the processing unit 82 implements the steps of the method for processing a current image of an image sequence previously described, according to the instructions of the computer program 83. For this purpose, the transmission device further comprises: a module for identification MOD_ID (84) of at least one region to be constructed associated with the current image, called unknown region, a module for selection MOD_Select (85) of a construction technique for constructing the unknown region, a module for association MOD_Assoc_Indic (86) of at least one confidence indicator with the unknown region, the confidence indicator Indic being determined by taking into account the construction technique.

Optionally, not shown, the processing device according to the invention further comprises a module MOD_GEN_$I_T$ for generation of an image to be processed, corresponding to the union of the current image and said at least one unknown region.

According to another shown by dotted lines, the processing device according to the invention further comprises a module MOD_IC (87) for construction and restitution of a confidence image representative of said at least one confidence indicator.

These modules are controlled by the microprocessor of the processing unit 82. Naturally, these modules can be implemented in various ways, notably in wired form or in software form.

The invention claimed is:

1. A method for processing a current image of an image sequence, comprising:
   identifying at least one region to be constructed in said current image, called unknown region, said at least one unknown region having a size strictly less than a size of said current image,
   automatically selecting, using at least one processor, at least one construction technique for constructing said at least one unknown region to at least one constructed region in said current image;
   once said automatic selection is performed, associating, by said at least one processor, at least one confidence indicator with said at least one unknown region and storing said at least one confidence indicator into at least one memory, said at least one confidence indicator being determined for a construction of said at least one unknown region which would be obtained by said selected at least one construction technique, and being an item of information to assist in post processing at least one image including a representation of said at least one unknown region.

2. The method for processing a current image of an image sequence according to claim 1, wherein said identification of said at least one unknown region implements:
   a separation of said current image into at least one foreground and one background, and/or
   an extrapolation of a change of viewpoint of said current image.

3. The method for processing a current image of an image sequence according to claim 1, wherein it further comprises an extraction by said at least one processor of at least one of said at least one unknown region or of a part of said at least one unknown region.

4. The method for processing a current image of an image sequence according to claim 1, further comprising a construction, by said at least one processor, of said at least one image including a representation of said at least one unknown region, said representation being representative of said at least one confidence indicator associated with said at least one unknown region.

5. The method for processing a current image of an image sequence according to claim 4, wherein said method further comprises a construction and restitution by said at least one processor of a confidence image representative of said at least one confidence indicator, and including said representation of said at least one unknown region.

6. The method for processing a current image of an image sequence according to claim 5, wherein said construction of a confidence image comprises:
   initialization of said confidence image,
   association of a constant colour and/or pattern with each pixel of a region distinct from said at least one unknown region of said current image, called a known region of said current image, delivering colour pixels associated with said known region,
   for each pixel to be constructed of said at least one unknown region, called unknown pixel, association of a colour and/or pattern with the confidence indicator obtained for said unknown pixel, delivering of a colour pixel associated with the unknown region, said colour being distinct from said constant colour,
   formation of said confidence image comprising said colour pixels and/or patterns associated respectively with said known region and with said unknown region.

7. The method for processing a current image of an image sequence according to claim 4, wherein said method further comprises a restitution by said at least one processor of an image to be post-processed, said image to be post-processed corresponding to a union of said current image and said representation of said at least one unknown region.

8. The method for processing a current image of an image sequence according to claim 7, further comprising:
   generating, by said at least one processor, an image to be processed corresponding to a union of said current image and said at least one unknown region, and
   combining, by said at least one processor, said image to be processed and a confidence image representative of said at least one confidence indicator and including said representation of said at least one unknown region, so as to obtain said image to be post-processed.

9. The method for processing a current image of an image sequence according to claim 7, further comprising obtaining, by said at least one processor, said representation of said at least one unknown region by superimposing said at least one constructed region and visual information representative of said at least one confidence indicator associated with said at least one unknown region.

10. The method for processing a current image of an image sequence according to claim 1, wherein said automatic selection of said at least one construction technique is performed using at least one of the following:
    construction by temporal inpainting;
    construction by spatial inpainting;
    construction by inter-view inpainting, when a device for capturing said current image is equipped with at least two distinct sensors.

11. The method for processing a current image of an image sequence according to claim 10, wherein said association of at least one confidence indicator comprises, for at least one pixel to be constructed of said at least one unknown region:
    determining a first value representative of the use of said technique for construction by temporal inpainting or of said technique for construction by inter-view inpainting to construct said pixel, said first value being respectively inversely proportional to a term corresponding to a temporal or inter-view distance between said current image and a source image used for said temporal or said inter-view inpainting, said first value being null when said technique for construction by spatial inpainting is used,
    determining a second value representative of the use of said technique for construction by temporal inpainting or said technique for construction by inter-view inpainting to construct said pixel, said second value being null when said technique for construction by spatial inpainting is used, said second value being inversely proportional to a term corresponding to a mean square error between said source image and an image to be processed, said image to be processed corresponding to a union of said current image and of said at least one unknown region, and said mean square error being measured based on an alignment of said source image and said image to be processed, over a known region common to said source image and said image to be processed after said alignment and having a size in pixels, said mean square error in said term being divided by said size in pixels, determining a third value inversely proportional to a term corresponding to a minimum distance between said at least one pixel to be constructed and a pixel of a region distinct from said at least one unknown region of said current image, called a known region of said current image, determining a fourth value representative of the application of a colour and/or luminance compensation applied to said at least one pixel to be constructed, and obtaining said confidence indicator by linearly combining said first, second, third and fourth values.

12. The method for processing a current image of an image sequence according to claim 11, wherein said first, second, third and fourth values are weighted according to whether said pixel belongs to a region of interest and/or the salience of said pixel.

13. The method for processing a current image of an image sequence according to claim 1, wherein said at least one confidence indicator is determined independently of said at least one constructed region.

14. The method for processing a current image of an image sequence according to claim 1, wherein said at least one unknown region is chosen among at least one of a hidden region and a revealed region.

15. A non-transitory computer readable storage medium tangibly embodying a program of instructions executable by a computer to perform a method for processing a current image of an image sequence comprising:

automatically selecting at least one construction technique for constructing at least one identified region to be constructed in said current image, called unknown region, said at least one unknown region having a size strictly less than a size of said current image, once said automatic selection is performed, associating at least one confidence indicator with said at least one unknown region, said at least one confidence indicator being determined for a construction of said at least one unknown region which would be obtained by said selected at least one construction technique, and being an item of information to assist in post-processing at least one image including a representation of said at least one unknown region.

16. The non-transitory computer readable storage medium of claim 15, wherein said at least one confidence indicator is determined independently of said at least one constructed region.

17. The non-transitory computer readable storage medium of claim 15, wherein said at least one unknown region is chosen among at least one of a hidden region and a revealed region.

18. A device for processing a current image of an image sequence comprising at least one processor and at least one memory, said at least one processor being configured to:

automatically select at least one construction technique for constructing at least one region to be constructed in said current image, called unknown region, said at least one unknown region having a size strictly less than a size of said current image, associate, once said automatic selection is performed, at least one confidence indicator with said at least one unknown region and storing said at least one confidence indicator into said at least one memory, said at least one confidence indicator being determined for a construction of said at least one unknown region which would be obtained by said selected at least one construction technique, and being an item of information to assist in post-processing at least one image including a representation of said at least one unknown region.

19. The device for processing a current image of an image sequence according to claim 18, wherein said at least one processor is further configured to construct said at least one image including said representation of said at least one unknown region, said representation being representative of said at least one confidence indicator associated with said at least one unknown region.

20. The device for processing a current image of an image sequence according to claim 19, wherein said at least one processor is further configured to identify said at least one unknown region.

21. The device for processing a current image of an image sequence according to claim 18, wherein said at least one processor is configured for determining said at least one confidence indicator independently of said at least one constructed region.

22. The device for processing a current image of an image sequence according to claim 18, wherein said at least one unknown region is chosen among at least one of a hidden region and a revealed region.

* * * * *